L. B. BENTON.
Cultivator.
No. 30,711. Patented Nov. 27, 1860.
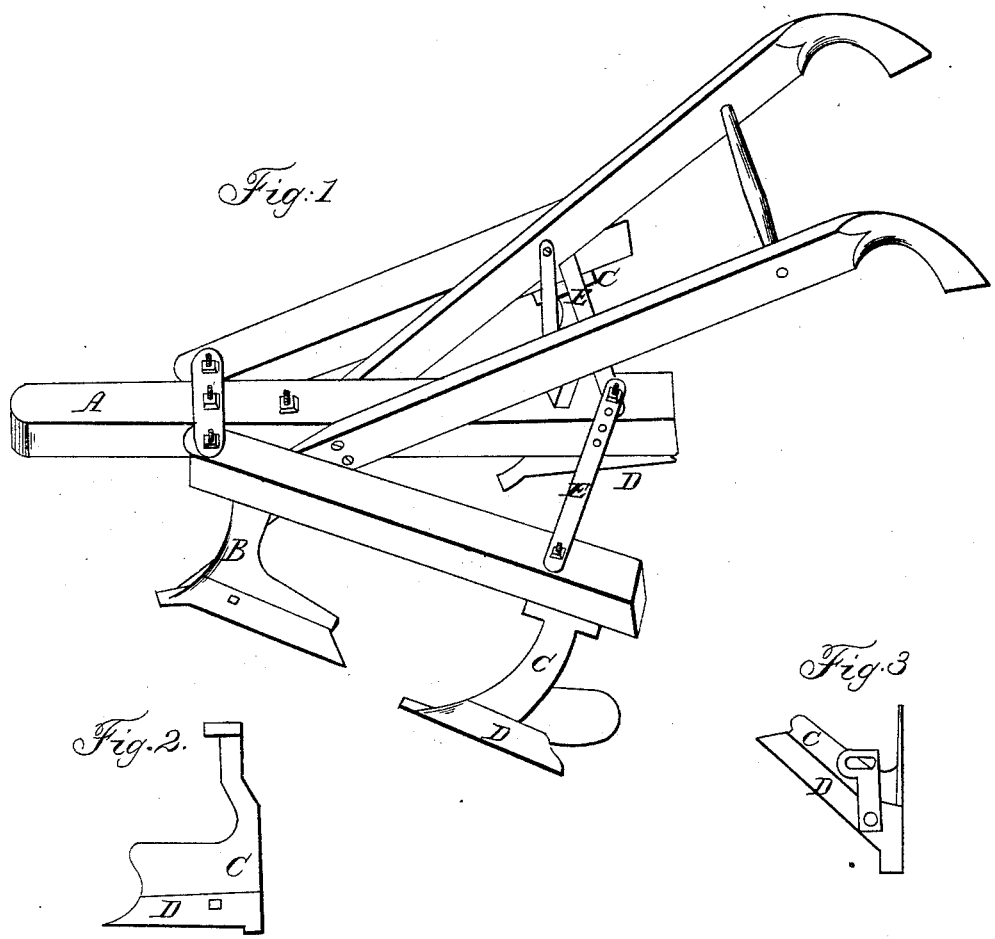

UNITED STATES PATENT OFFICE.

LUTHER B. BENTON, OF PENN YAN, NEW YORK.

IMPROVEMENT IN CULTIVATORS.

Specification forming part of Letters Patent No. 30,711, dated November 27, 1860.

*To all whom it may concern:*

Be it known that I, LUTHER B. BENTON, of Penn Yan, in the county of Yates and State of New York, have invented a new and useful Improvement in Cultivators; and I do hereby declare that the following is a full, clear, and exact description of the construction and operation of the same, reference being had to the annexed drawings, making a part of this specification, in which—

Figure 1 is a side elevation. Fig. 2 is a front view of the left-side plow or tooth. Fig. 3 is a bird's-eye view of the same.

The letters of reference refer to the same parts in each figure.

A is a frame, made of wood, as represented in Fig. 1. The two outside pieces are at their forward ends pivoted to the center piece by means of a bar extending across them, and are thus fastened together. The hind ends are secured and kept in proper position by means of the bars E and E. These bars are pivoted to the hind ends of the outside pieces, and each extends to the center piece, where they are held by a bolt.

B is the forward plow or tooth. It is made with a mold-board each side of the standard, and is provided with a share that has a point, with wings each side of the point. These wings form an obtuse angle with the center line of the cultivator, so as to cut over the ground that would be between the hind teeth when extended.

C and C are the hind plows or teeth. They are made alike, except one turns its furrow to the right and the other to the left. The standards of each have an offset between the moldboard and upper end. These offsets are made to change the line of stress, so that the teeth would not be so easily turned or broken by any resistance or obstruction at the rear end of the wing of the share; also, that the points may be placed outside of the frame, so that when cultivating nurseries or vineyards the teeth may be made to pass near to the plants or vines without danger of the frame touching them.

The upper end of the standard or cross-piece of the same is provided with an elongated hole at the rear end for the purpose of adjusting the plows in the line of direction, as when the width of the cultivator is changed by means of the bars E and E.

D and D are shares for the hind plows. One cuts to the right and the other to the left of the point. The shares are secured to the plows by bolts or otherwise, and each share has a land-side portion that extends back behind the point about even with the wing. This landside portion extends below the line of the point, so as to cut into the bottom of the furrow deeper than the point, as shown in Fig. 1. The lower edge is made thin and sharp, so as to cut into the bottom of the furrow without much force, it being thus constructed to give a new cutting-edge when a new point is applied. The use of this cutting-edge is to keep the cultivator moving straight in the line of draft and prevent it from dodging to the right or left when the wings of the shares come in contact with weeds, grass, or other things that should be cut off.

E and E are bars, pivoted near the rear ends of the outside pieces of the frame, or may be held by one of the bolts that holds the plows. The inner ends have a series of holes to adjust the width of the cultivator, and are held by a bolt to the center piece. By means of the offsets in the standards of the hind plows, C and C, the plows may be changed to turn the furrows either inward or outward without changing the width of the frame with these bars and cut over the same width of ground as before.

What I claim as new, and desire to secure by Letters Patent, is—

The arrangement of the teeth C, shares and landside D, frame A, and bars E, the whole being constructed as described, for the purposes set forth.

LUTHER B. BENTON.

Witnesses:
CHARLES KETCHUM,
WM. COMSTOCK.